United States Patent
Urano et al.

(10) Patent No.: US 9,495,873 B2
(45) Date of Patent: Nov. 15, 2016

(54) OTHER-VEHICLE DETECTION DEVICE AND OTHER-VEHICLE DETECTION METHOD

(75) Inventors: Hiromitsu Urano, Susono (JP); Katsuhiro Sakai, Hadano (JP); Toshiki Kindo, Yokohama (JP); Kentaro Ichikawa, Sunto-gun (JP); Masahiro Harada, Atsugi (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 100 days.

(21) Appl. No.: 14/124,171

(22) PCT Filed: Jun. 9, 2011

(86) PCT No.: PCT/JP2011/063278
§ 371 (c)(1),
(2), (4) Date: Dec. 5, 2013

(87) PCT Pub. No.: WO2012/169052
PCT Pub. Date: Dec. 13, 2012

(65) Prior Publication Data
US 2014/0104078 A1    Apr. 17, 2014

(51) Int. Cl.
*G08G 1/16* (2006.01)
*G06K 9/00* (2006.01)
(Continued)

(52) U.S. Cl.
CPC ............ *G08G 1/16* (2013.01); *G06K 9/00805* (2013.01); *G06K 9/00825* (2013.01); *G08G 1/166* (2013.01); *G08G 1/167* (2013.01);
(Continued)

(58) Field of Classification Search
CPC ............ B60R 21/013; B60R 21/0134; B60R 2021/01322; G01S 2013/9353; G01S 2013/9321; G01S 2013/9339; G01S 17/936
USPC ................... 340/435; 701/300, 301
See application file for complete search history.

(56) References Cited

U.S. PATENT DOCUMENTS

| 5,710,565 A | 1/1998 | Shirai et al. |
| 6,025,797 A | 2/2000 | Kawai et al. |

(Continued)

FOREIGN PATENT DOCUMENTS

| JP | 2001-242242 A | 9/2001 |
| JP | 2003-267084 A | 9/2003 |

(Continued)

OTHER PUBLICATIONS

Office Action of U.S. Appl. No. 12/831,473 dated Aug. 14, 2012.
(Continued)

*Primary Examiner* — Benjamin C Lee
*Assistant Examiner* — Benyam Haile
(74) *Attorney, Agent, or Firm* — Sughrue Mion, PLLC (57) ABSTRACT

An other-vehicle detector 18 of an other-vehicle detection device 10a detects an other-vehicle VO around a host vehicle VM based on the predetermined feature amount. A detection reference value adjustment unit 16 of the other-vehicle detection device 10a, regarding the feature amount for detecting the other-vehicle VO around the host vehicle VM, changes a threshold value of the feature amount for detecting the other-vehicle VO, and detects the other-vehicle VO, based on a relative positional relationship between the other-vehicle VO and the host vehicle VM. In this way, it is possible to detect the existence of the other-vehicle VO according to the situation more.

2 Claims, 9 Drawing Sheets

(51) Int. Cl.
  *B60R 21/0132* (2006.01)
  *G01S 17/93* (2006.01)
  *B60R 21/0134* (2006.01)
  *B60R 21/013* (2006.01)

(52) U.S. Cl.
  CPC ......... *B60R 21/013* (2013.01); *B60R 21/0132* (2013.01); *B60R 21/0134* (2013.01); *G01S 17/936* (2013.01)

(56) References Cited

U.S. PATENT DOCUMENTS

| | | | |
|---|---|---|---|
| 6,456,231 B1 | 9/2002 | McEwan | |
| 6,615,137 B2 * | 9/2003 | Lutter et al. | 701/301 |
| 7,061,373 B2 * | 6/2006 | Takahashi | 340/435 |
| 7,379,813 B2 * | 5/2008 | Kubota et al. | 701/523 |
| 7,409,295 B2 | 8/2008 | Paradie | |
| 7,441,624 B2 | 10/2008 | Tobata | |
| 7,504,986 B2 * | 3/2009 | Brandt et al. | 342/70 |
| 7,940,206 B2 | 5/2011 | Nohara et al. | |
| 8,805,601 B2 | 8/2014 | Aso et al. | |
| 2003/0139883 A1 | 7/2003 | Takafuji et al. | |
| 2003/0217880 A1 | 11/2003 | Isogai et al. | |
| 2004/0090117 A1 | 5/2004 | Dudeck et al. | |
| 2005/0012602 A1 | 1/2005 | Knoop et al. | |
| 2005/0012604 A1 * | 1/2005 | Takahashi | 340/435 |
| 2005/0087381 A1 | 4/2005 | Tobata | |
| 2005/0174222 A1 * | 8/2005 | Kikuchi | G01S 7/40 340/435 |
| 2006/0239559 A1 | 10/2006 | Maris | |
| 2007/0043491 A1 | 2/2007 | Goerick et al. | |
| 2007/0120731 A1 | 5/2007 | Kelly, Jr. et al. | |
| 2007/0233353 A1 | 10/2007 | Kade | |
| 2008/0004807 A1 | 1/2008 | Kimura et al. | |
| 2008/0024353 A1 | 1/2008 | Schneider | |
| 2008/0030398 A1 | 2/2008 | Nakamura | |
| 2008/0136612 A1 | 6/2008 | Machii et al. | |
| 2008/0140303 A1 | 6/2008 | Hiruta et al. | |
| 2008/0300733 A1 | 12/2008 | Rasshofer et al. | |
| 2008/0303696 A1 | 12/2008 | Aso et al. | |
| 2009/0024357 A1 | 1/2009 | Aso et al. | |
| 2009/0085800 A1 | 4/2009 | Alland et al. | |
| 2009/0326819 A1 * | 12/2009 | Taguchi | 701/301 |
| 2010/0001897 A1 | 1/2010 | Lyman | |
| 2010/0007728 A1 | 1/2010 | Strauss et al. | |
| 2014/0303883 A1 | 10/2014 | Aso et al. | |

FOREIGN PATENT DOCUMENTS

| | | |
|---|---|---|
| JP | 2004-85337 A | 3/2004 |
| JP | 2005-126006 A | 5/2005 |
| JP | 2006-309445 A | 11/2006 |
| JP | 2007-279970 A | 10/2007 |
| JP | 2007-329762 A | 12/2007 |
| JP | 2008-026985 A | 2/2008 |
| JP | 2008-40819 A | 2/2008 |
| JP | 2008-46845 A | 2/2008 |
| JP | 2008-52399 A | 3/2008 |
| JP | 2008-126755 A | 6/2008 |
| JP | 2009-53923 A | 3/2009 |
| JP | 2009-122859 A | 6/2009 |
| JP | 2010-23721 A | 2/2010 |
| JP | 2011-18283 A | 1/2011 |
| JP | 2011-048641 A | 3/2011 |
| WO | 03/093857 A2 | 11/2003 |
| WO | 2007/102367 A1 | 9/2007 |

OTHER PUBLICATIONS

US Office Action dated Jul. 17, 2015 issued in U.S. Appl. No. 12/831,473.
US Office Action dated Dec. 3, 2015 issued in U.S. Appl. No. 12/831,473.
US Office Action dated Mar. 18, 2016 issued in U.S. Appl. No. 12/831,473.
US Office Action dated Aug. 14, 2012 issued in U.S. Appl. No. 12/831,473.
US Office Action dated Dec. 6, 2012 issued in U.S. Appl. No. 12/831,473.
US Office Action dated Dec. 18, 2014 issued in U.S. Appl. No. 12/831,473.
US Office Action dated Mar. 5, 2015 issued in U.S. Appl. No. 12/831,473.
Office Action dated Aug. 11, 2016 from the United States Patent and Trademark Office in U.S. Appl. No. 12/831,473.

\* cited by examiner

OTHER-VEHICLE DETECTION DEVICE AND OTHER-VEHICLE DETECTION METHOD

CROSS REFERENCE TO RELATED APPLICATION

This is a National Stage of International Application No. PCT/JP2011/063278 filed Jun. 9, 2011, the contents of which are incorporated herein by reference in its entirety.

The present invention relates to an other-vehicle detection device and an other-vehicle detection method that detect an other-vehicle around a host vehicle using data acquired from the sensing device and the like.

BACKGROUND ART

In recent years, a system in which a device that detects an object using data acquired from sensing devices such as a camera or a radar is mounted on a vehicle, and which causes a vehicle to automatically travel by the device, or supports a driver's driving operation is proposed. For example, in the device disclosed in Patent Literature 1, in a coordination mode in a case where there is no contradiction in a detection result of the vehicle by a plurality of sensors, the sensor performs a measurement of the vehicle. In the device disclosed in Patent Literature 1, in a case where contradiction in a detection result occurs, the sensors are in a master-slave mode, the sensor which has detected the vehicle becomes a master sensor and confirms the accuracy and the sensor which has not detected the vehicle becomes a slave sensor and performs a new search. In the device in Patent Literature 1, in a case where other than any one of the sensors is inoperable, only the operable sensors perform the measurement of the vehicle, in an independent mode.

CITATION LIST

Patent Literature

[Patent Literature 1] Japanese Unexamined Patent Application Publication No. 2004-85337

SUMMARY OF INVENTION

Technical Problem

However, in the technology described above, there is room for improvement in terms of appropriately detecting the existence of an other-vehicle around a host vehicle according to the situation.

The present invention is made in view of such circumstances. An object of the present invention is to provide an other-vehicle detection device and an other-vehicle detection method that can better detect the existence of the other-vehicle around the host vehicle according to the situation.

Solution to Problem

The present invention provides an other-vehicle detection device which includes an other-vehicle detection unit that detects the other-vehicle around a host vehicle based on a predetermined feature amount. The other-vehicle detection unit changes a threshold value of the feature amount for detecting the other-vehicle, and detects the other-vehicle, based on a relative positional relationship between the other-vehicle and the host vehicle.

According to this configuration, the other-vehicle detection unit that detects the other-vehicle around the host vehicle based on the predetermined feature amount, changes the threshold value of the feature amount for detecting the other-vehicle, and detects the other-vehicle, based on the relative positional relationship between the other-vehicle and the host vehicle. In this way, it is possible to better detect the existence of the other-vehicle according to the situation.

In this case, in a case where the relative positional relationship between the other-vehicle and the host vehicle needs to change the traveling state of the host vehicle when the other-vehicle is detected by the other-vehicle detection unit but actually does not exist, the other-vehicle detection unit can change the threshold value of the feature amount for detecting the other-vehicle such that the other-vehicle is detected with more difficulty, and can detect the other-vehicle.

According to this configuration, in a case where the relative positional relationship between the other-vehicle and the host vehicle needs to change the traveling state of the host vehicle when the other-vehicle is detected by the other-vehicle detection unit but actually does not exist, the other-vehicle detection unit changes the threshold value of the feature amount for detecting the other-vehicle such that the other-vehicle is detected with more difficulty, and detects the other-vehicle. Therefore, when the erroneous detection occurs, the traveling state of the host vehicle such as the avoidance operation needs to be changed, and it is possible to prevent the erroneous detection in the situation in which the erroneous detection cannot be easily accepted.

In addition, the other-vehicle detection unit can detect the other-vehicle by the feature amount based on a detection value of sensors installed on the host vehicle, and change the threshold value of the feature amount for detecting the other-vehicle based on at least one of the position where the sensors are installed and the detection direction of the sensors, and can detect the other-vehicle.

According to this configuration, the other-vehicle detection unit detects the other-vehicle by the feature amount based on the detection value of the sensors installed on the host vehicle, and changes the threshold value of the feature amount for detecting the other-vehicle based on at least any of the position where the sensors are installed and the detection direction of the sensors, and detects the other-vehicle. Therefore, it is possible to detect the existence of the other-vehicle according to the position where sensors are installed or the detection direction of the sensors.

In addition, it is preferable that, until the traveling state of the host vehicle changes, the other-vehicle detection unit detects the other-vehicle by setting the threshold value of the feature amount for detecting the other-vehicle to the threshold value such that the other-vehicle is detected more easily, and after the traveling state of the host vehicle changes, the other-vehicle detection unit detects the other-vehicle by setting the threshold value of the feature amount for detecting the other-vehicle to the threshold value such that the other-vehicle is detected with more difficulty.

According to this configuration, the other-vehicle detection unit, until the traveling state of the host vehicle changes, detects the other-vehicle by setting the threshold value of the feature amount for detecting the other-vehicle to the threshold value such that the other-vehicle is detected more easily, and after the traveling state of the host vehicle changes, detects the other-vehicle by setting the threshold value of the feature amount for detecting the other-vehicle to the threshold value such that the other-vehicle is detected with more difficulty. Therefore, in the situation where the erroneous detection can be easily accepted before the traveling state of the host vehicle changes, it is possible to prevent the non-detection of the other-vehicle with the threshold value by which the other-vehicle is detected more easily. In the situation where the erroneous detection cannot be easily accepted after the traveling state of the host vehicle changes, it is possible to prevent the erroneous detection of the other-vehicle with the threshold value by which the other-vehicle is detected with more difficulty.

In addition, the present invention provides an other-vehicle detection method for detecting an other-vehicle around a host vehicle based on a predetermined feature amount. The other-vehicle detection method includes: changing a threshold value of the feature amount for detecting the other-vehicle, based on a relative positional relationship between the other-vehicle and the host vehicle, and detecting the other-vehicle.

In this case, in a case where the relative positional relationship between the other-vehicle and the host vehicle needs to change the traveling state of the host vehicle when the other-vehicle is detected but actually does not exist, it is possible to change the threshold value of the feature amount for detecting the other-vehicle such that the other-vehicle is detected with more difficulty, and to detect the other-vehicle.

In addition, it is possible to detect the other-vehicle by the feature amount based on a detection value of sensors installed on the host vehicle, and changes the threshold value of the feature amount for detecting the other-vehicle, based on at least any of the position where the sensors are installed and the detection direction of the sensors, and to detect the other-vehicle.

In addition, it is possible to detect the other-vehicle by setting the threshold value of the feature amount for detecting the other-vehicle to the threshold value such that the other-vehicle is detected more easily, until the traveling state of the host vehicle changes, and to detect the other-vehicle by setting the threshold value of the feature amount for detecting the other-vehicle to the threshold value such that the other-vehicle is detected with more difficulty, after the traveling state of the host vehicle changes.

Advantageous Effects of Invention

According to the other-vehicle detection device and the other-vehicle detection method, it is possible to better detect the existence of the other-vehicle according to the situation.

DESCRIPTION OF EMBODIMENTS

Hereinafter, an other-vehicle detection device and an other-vehicle detection method according to the embodiments of the present invention will be described with reference to the drawings.

Figure 1:
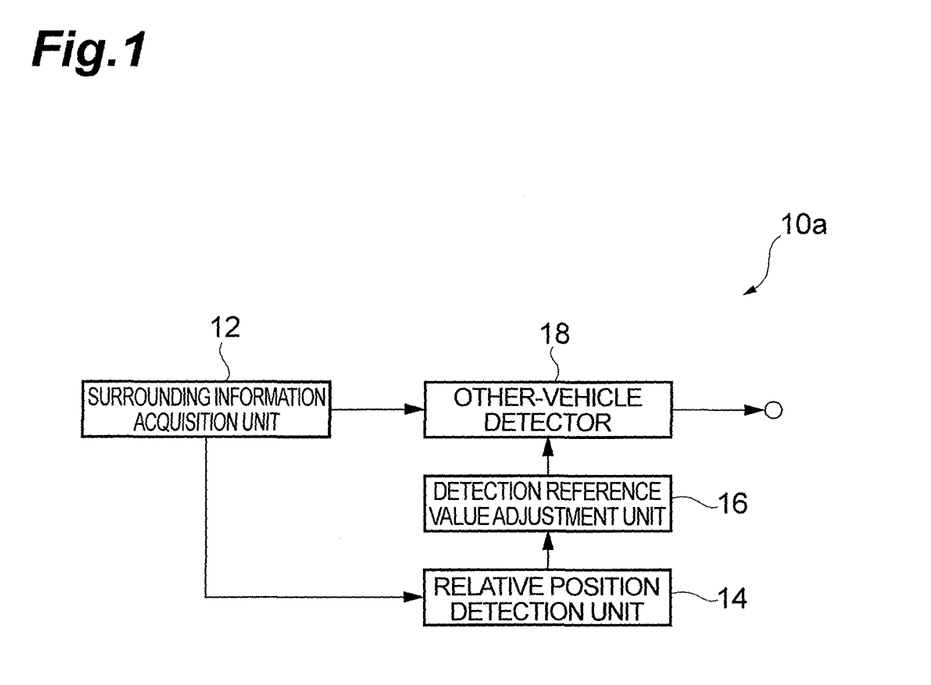
FIG. 1 is a diagram illustrating a configuration of an other-vehicle detection device according to a first embodiment.

As illustrated in FIG. 1, an other-vehicle detection device 10a according to the first embodiment of the present invention includes a surrounding information acquisition unit 12, a relative position detection unit 14, a detection reference value adjustment unit 16, and an other-vehicle detector 18. The other-vehicle detection device 10a according to the present embodiment is mounted on a vehicle. The other-vehicle detection device 10a detects an other-vehicle around a host vehicle, in order to perform an automatic driving that does not depend on a driver's operation or in order to guide a driver's driving operation.

Figure 2:
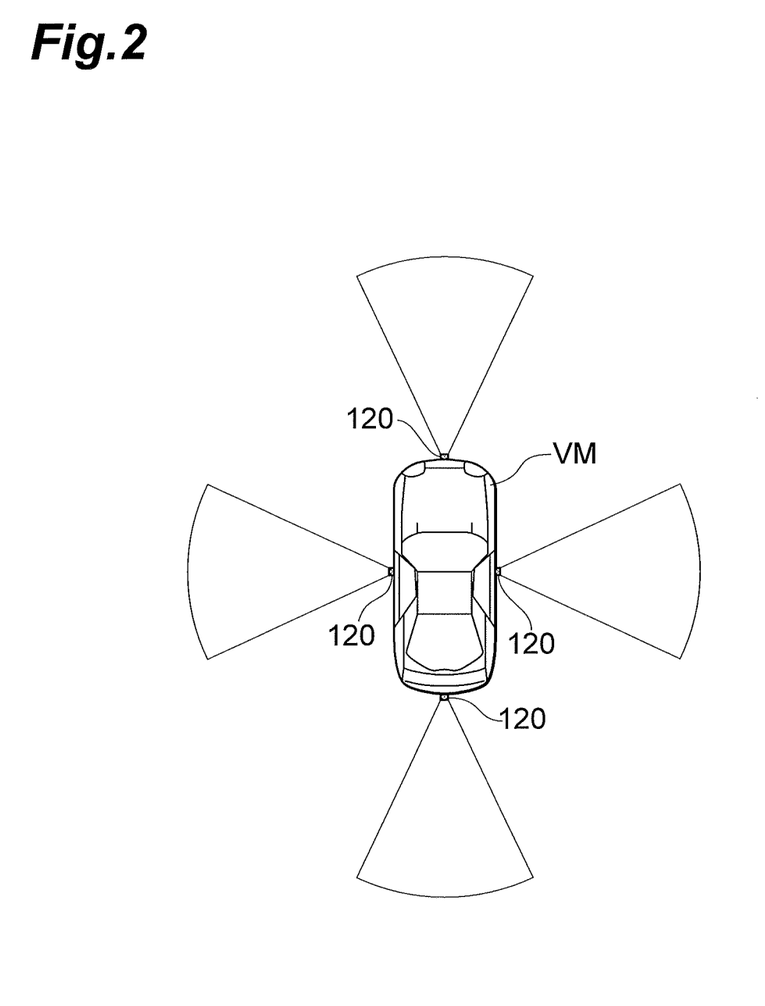
FIG. 2 is a plan view illustrating sensors installed on a host vehicle.

The surrounding information acquisition unit 12 acquires information, which is obtainable by sensors such as a camera, LIDAR or a radar, of an object existing around the host vehicle, and environmental information such as time and lane information, road information which is obtainable by a database searching, to properly output to a subsequent stage as it is necessary. As illustrated in FIG. 2, sensors 120 of the surrounding information acquisition unit 12 are installed on four positions of the host vehicle VM: front part, left side surface, right side surface, and rear part.

The relative position detection unit 14 detects a relative position between the object around the host vehicle and the host vehicle VM based on the information acquired by the surrounding information acquisition unit 12, to output to the subsequent stage.

The detection reference value adjustment unit 16 changes the reference value which detects the other-vehicle from the detection value of the surrounding information acquired by the surrounding information acquisition unit 12, based on the relative position between the object around the host vehicle VM and the host vehicle VM detected by the relative position detection unit 14, to output the reference value.

The other-vehicle detector 18 detects the other-vehicle based on the detection value of the surrounding information acquired by the surrounding information acquisition unit 12 and the reference value adjusted by the detection reference value adjustment unit 16. The other-vehicle detector 18 outputs other-vehicle information such as the position, speed and acceleration of the detected other-vehicle.

Hereinafter, the operation of the other-vehicle detection device 10a in the present embodiment will be described. As described in FIG. 3, the surrounding information acquisition unit 12 of the other-vehicle detection device 10a acquires information by the sensors such as a camera or a LIDAR, and the relative position detection unit 14 detects the relative position between the object around the host vehicle VM and the host vehicle VM (S11).

Figure 3:
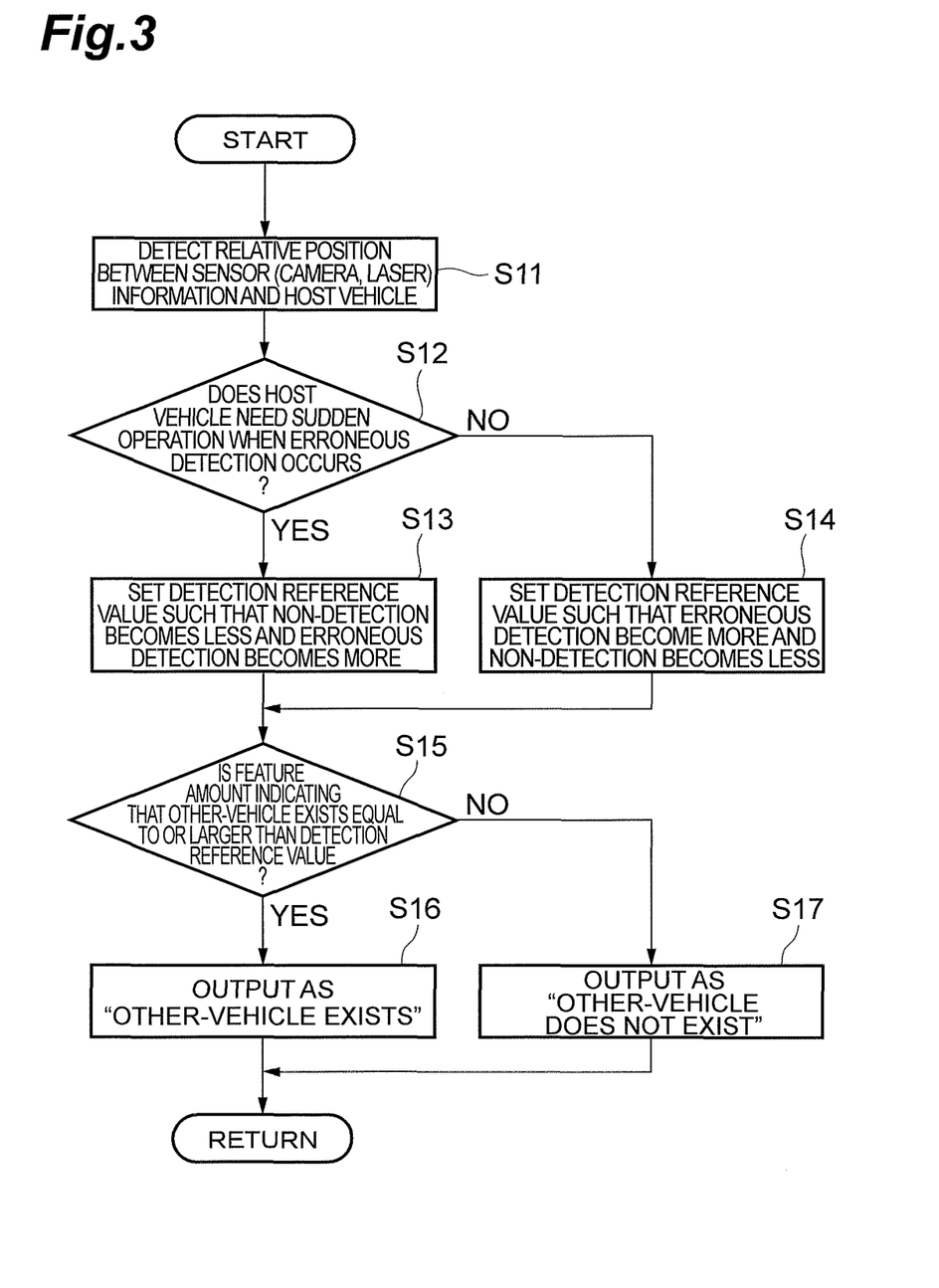
FIG. 3 is a flow chart illustrating an operation of the other-vehicle detection device according to the first embodiment.

The detection reference value adjustment unit 16, when an erroneous detection occurs, determines whether or not the relative positional relationship between the host vehicle VM and the detected object requires the host vehicle VM to change the traveling state by a sudden operation (S12).

Figure 4:
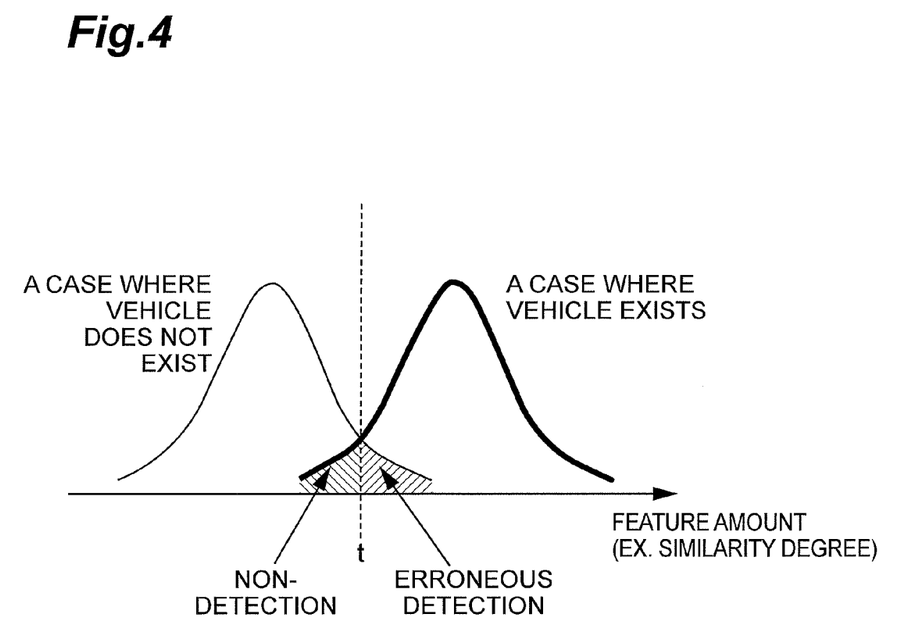
FIG. 4 is a graph illustrating a probability density distribution in a case where a vehicle exists and in a case where a vehicle does not exist, in a specific feature amount space.

Here, for example, it is assumed that the sensors 120 are cameras, and the existence of the other-vehicle is determined by a degree of similarity of the acquired image and patterns used in pattern recognition. Here, as illustrated in FIG. 4, a feature amount (degree of similarity) is plotted on the horizontal axis, and the distribution of the probability density in a case where the other-vehicle exists and in a case where the other-vehicle does not exists, is plotted. As illustrated in FIG. 4, since the distribution of the probability density in a case where the other-vehicle exists and in a case where the other-vehicle does not exists is separated, it is possible to determine the existence of the other-vehicle in the images obtained by the camera.

In FIG. 4, when the reference value which detects the existence of the other-vehicle is set to be t, there is a region of non-detection in which it is detected that the other-vehicle does not exist while the other-vehicle actually exists, and a region of erroneous detection in which it is detected that the other-vehicle exists while the other-vehicle actually does not exist. When the detection reference value t is shifted to the left, the non-detection decreases while the erroneous detection increases. On the other hand, when the detection reference value t is shifted to the right, the erroneous detection decreases while the non-detection increases. Therefore, in the present embodiment, the detection reference value adjustment unit 16 changes the detection reference value based on the presence or absence of the sudden operation accompanied by the erroneous detection.

Figure 5:
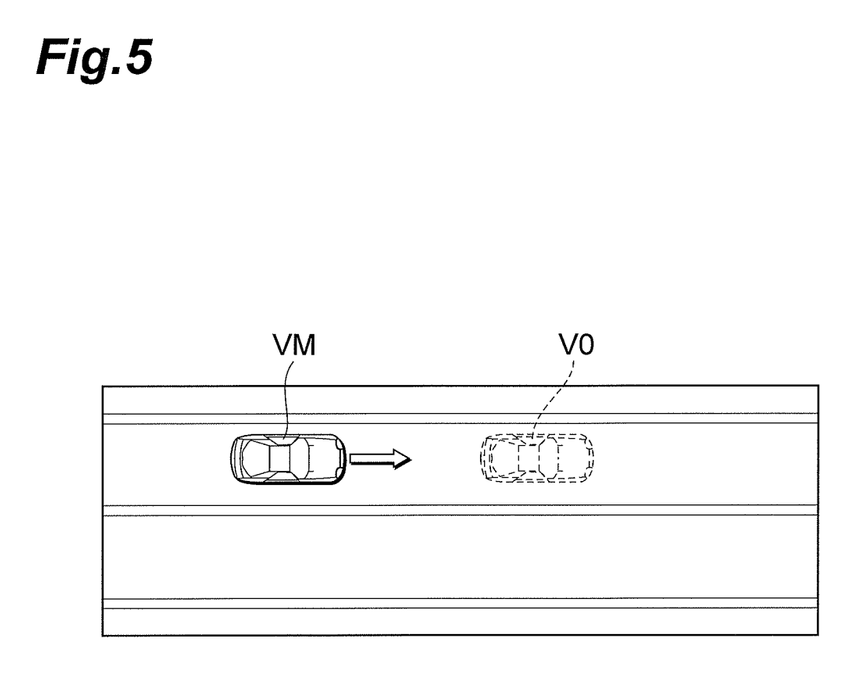
FIG. 5 is a plan view illustrating a situation in a case where the host vehicle travels straightforward.

For example, as illustrated in FIG. 5, it is assumed that the host vehicle VM travels straightforward. In a case where it is detected that the other-vehicle VO ahead does not exist while actually other-vehicle VO exists (non-detection), there is a possibility that the host vehicle VM may come into contact with the other-vehicle VO. However, in a case where it is detected that the other-vehicle VO ahead exists while actually other-vehicle VO does not exist (erroneous detection), the host vehicle VM tries to avoid the contact that might not occur originally by a sudden deceleration or a sudden steering. As a result, the traffic order may be disturbed, and there is a concern that contact may occur with another other-vehicle which actually exists. In the case illustrated in FIG. 5, although both the non-detection and the erroneous detection are not preferred, erroneous detection is less preferred. Therefore, the detection reference value adjustment unit 16 shifts the detection reference value t in FIG. 3 to the right, to set the detection reference value such that the non-detection becomes more and the erroneous detection becomes less (S13).

Figure 6:
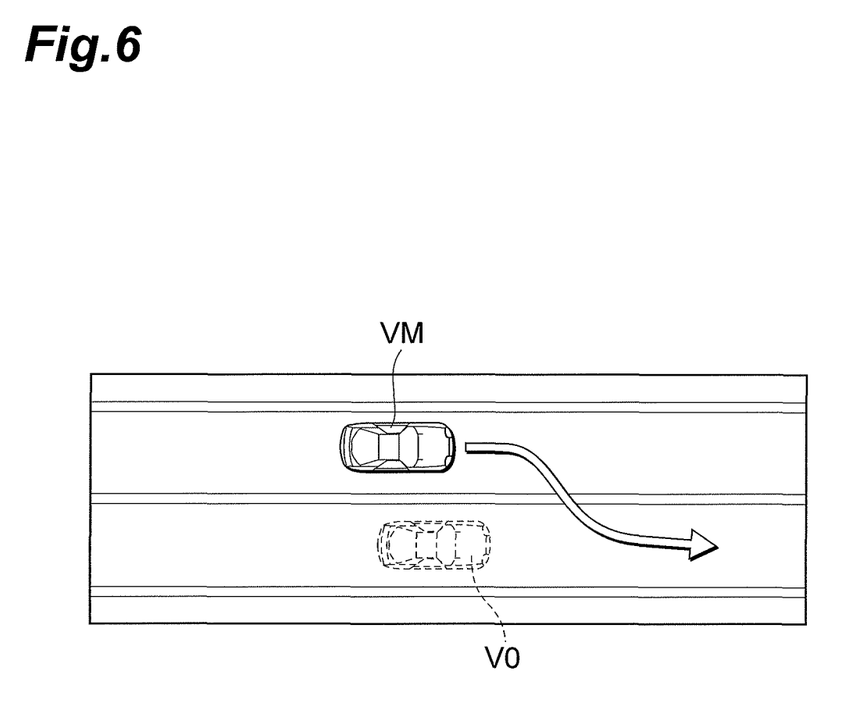
FIG. 6 is a plan view illustrating a situation in a case where the host vehicle changes lanes.

In contrast, as illustrated in FIG. 6, it is assumed that the host vehicle VM performs a lane change. In a case where the other-vehicle VO traveling in the neighboring lane is not detected, the host vehicle VM comes in contact with the other-vehicle VO. On the other hand, in a case where the other-vehicle VO is erroneously detected, the host vehicle VM does not perform the lane change at a time when the other-vehicle VO is erroneously detected in order to avoid contact. In the case illustrated in FIG. 6, there is a concern that the non-detection may cause a contact. However, it is expected that the erroneous detection may reduce the contact instead of imposing a constraint on the behavior of the host vehicle VM. As a result, in the case illustrated in FIG. 6, since the case of non-detection is less preferred, the detection reference value adjustment unit 16 shifts the detection reference value t in FIG. 3 to the left, to set the detection reference value such that the erroneous detection becomes more and the non-detection becomes less (S14).

Here, for a similar reason, the detection reference value adjustment unit 16 may change the detection reference value per each sensor 120 based on the positions where the sensors 120 are installed and the detection direction. For example, regarding the sensor 120 disposed on the front part of the host vehicle VM, the detection reference value adjustment unit 16, for a similar reason described above, shifts the detection reference value t in FIG. 3 to the right, to set the detection reference value such that the non-detection becomes more and the erroneous detection becomes less. On the other hand, regarding the sensors 120 disposed on the sides of the host vehicle VM, the detection reference value adjustment unit 16, shifts the detection reference value t in FIG. 3 to the left, to set the detection reference value such that the erroneous detection becomes more and the non-detection becomes less.

In accordance with the reference value adjusted by the detection reference value adjustment unit 16, when the feature amount indicating the existence of other-vehicle VO is equal to or larger than the reference value, the other-vehicle detector 18 outputs that the other-vehicle exists (S15, S16), and when the feature amount representing the existence of other-vehicle VO is smaller than the reference value, the other-vehicle detector 18 outputs that the other-vehicle does not exist (S15, S17).

According to the present embodiment, the detection reference value adjustment unit 16 of the other-vehicle detection device 10a, regarding the feature amount for detecting the other-vehicle VO around the host vehicle VM, based on the relative positional relationship between the other-vehicle VO and the host vehicle VM, changes the threshold value of the feature amount for detecting the other-vehicle VO, and detects the other-vehicle VO.

In addition, according to the present embodiment, in a case where the relative positional relationship between the other-vehicle VO and the host vehicle VM needs to change the traveling state of the host vehicle VM when the other-vehicle VO is detected by the other-vehicle detector 18 but actually does not exist, the detection reference value adjustment unit 16 changes the threshold value of the feature amount for detecting the other-vehicle VM such that the other-vehicle VO is detected with more difficulty, and detects the other-vehicle VO. For this reason, when the erroneous detection occurs, the traveling state of the host vehicle VM such as the avoidance operation needs to be changed, it is possible to prevent the erroneous detection in the situation where the erroneous detection cannot be easily accepted. That is, owing to the change of the detection reference value performed based on the presence or absence of the sudden operation of the host vehicle VM due to the erroneous detection, the safety is improved.

In addition, according to the present embodiment, the other-vehicle detector 18 detects the other-vehicle VO by the feature amount based on the detection value of the sensors 120 installed on the host vehicle VM, and changes the threshold value of the feature amount for detecting the other-vehicle VO based on at least one of the position where the sensors 120 are installed and the detection direction of the sensors 120 and detects the other-vehicle VO. Therefore, it is possible to detect the existence of the other-vehicle VO according to the position where sensors 120 are installed or the detection direction of the sensors 120.

Figure 7:
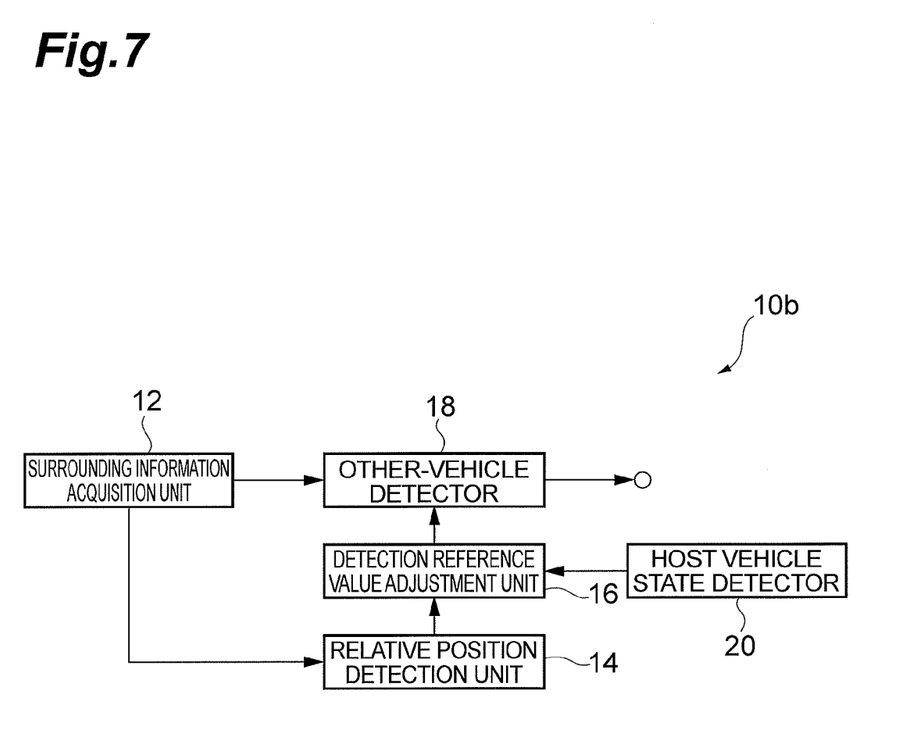
FIG. 7 is a diagram illustrating a configuration of the other-vehicle detection device according to the second embodiment.

Hereinafter, the second embodiment of the present invention will be described. As illustrated in FIG. 7, in the other-vehicle detection device 10a in the embodiment, a host vehicle state detector 20 is included that detects whether or not the host vehicle VM causes the traveling state such as an acceleration, a deceleration, and a steering to be changed. The detection reference value adjustment unit 16 changes the detection reference value based on the traveling state of the host vehicle VM detected by the host vehicle state detector 20.

Hereinafter, the operation of the other-vehicle detection device 10b in the present embodiment will be described. As described in FIG. 8, the surrounding information acquisition unit 12 of the other-vehicle detection device 10b acquires information by the sensors such as a camera or a LIDAR, and the host vehicle state detector 20 detects the traveling state of the host vehicle VM (S21).

Figure 8:
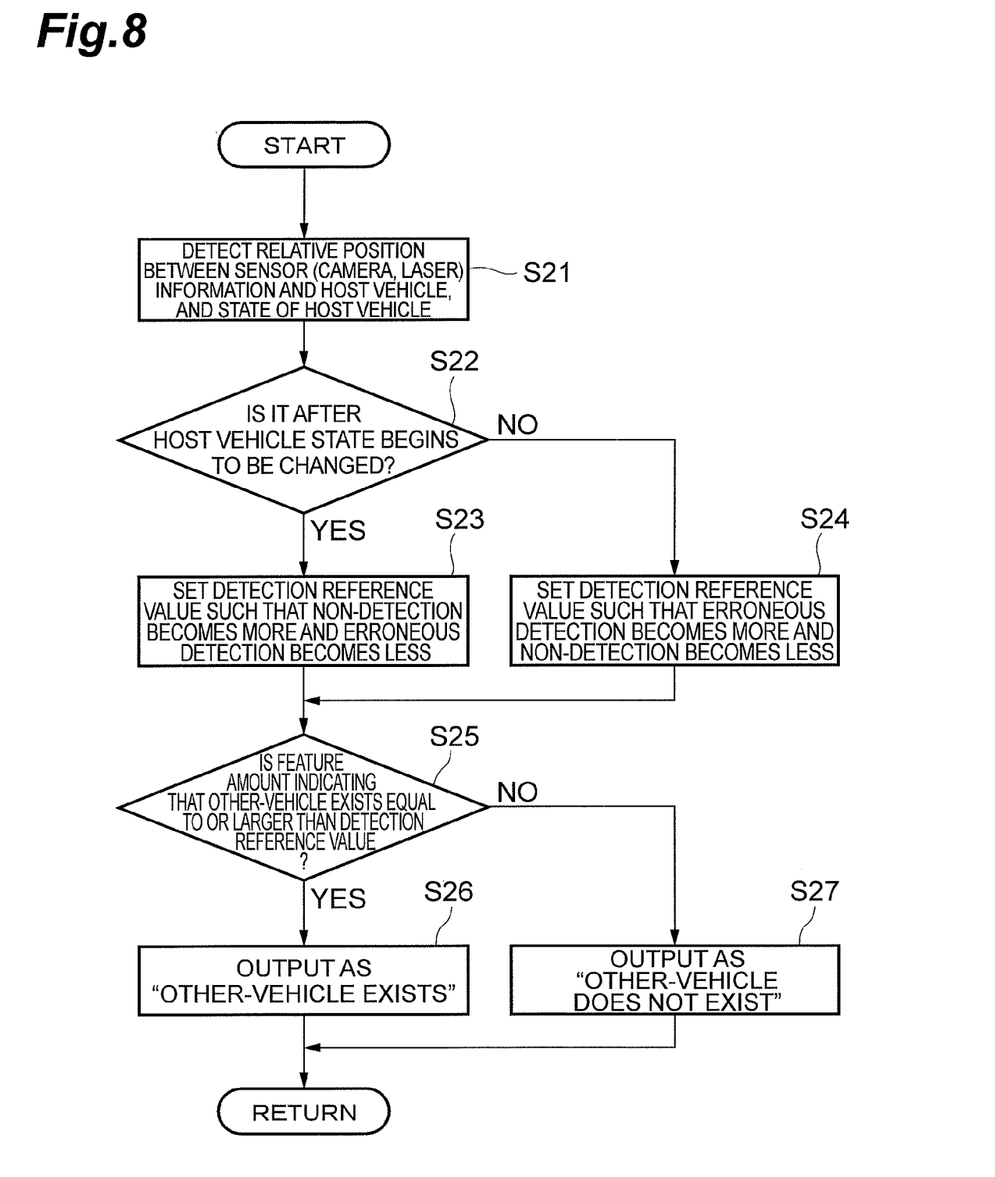
FIG. 8 is a flow chart illustrating an operation of the other-vehicle detection device according to the second embodiment.
Figure 9:
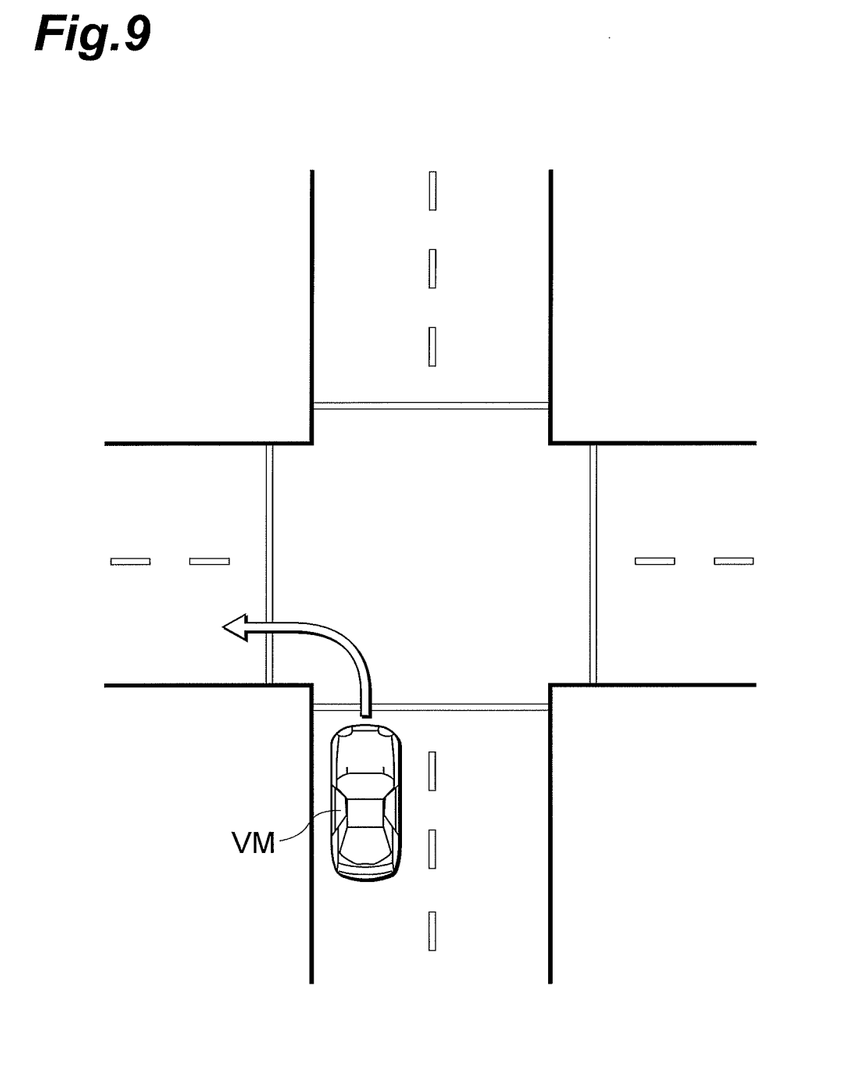
FIG. 9 is a plan view illustrating a situation in a case where the host vehicle turns left.

The detection reference value adjustment unit 16 determines whether or not the traveling state of the host vehicle VM is in the state that acceleration, deceleration, or turning are started, and the state begins to be changed (S22). As illustrated in FIG. 9, it is assumed that the host vehicle VM turns left at the intersection. Here, at the time after the host vehicle VM turns left, when the erroneous detection occurs, a new avoidance operation is needed which may disturb the traffic order, and there is a possibility to come in contact with another other-vehicle which actually exists. Therefore, after the travel state of the host vehicle begins to be changed, the detection reference value adjustment unit 16 shifts the detection reference value t in FIG. 3 to the right, and sets the detection reference value such that the non-detection becomes more and the erroneous detection becomes less (S23).

On the other hand, at the time before the host vehicle VM turns left, when the non-detection occurs, there is a possibility of coming in contact with the other-vehicle VM or the like which actually exists, and in case of the erroneous detection, since the left turn is not performed. Therefore, before the traveling state of the host vehicle VM is changed, the detection reference value adjustment unit 16 shifts the detection reference value t in FIG. 3 to the left, to set the detection reference value such that erroneous detection becomes more and the non-detection becomes less.

Similar to the first embodiment described above, in accordance with the reference value adjusted by the detection reference value adjustment unit 16, when the feature amount representing the existence of other-vehicle VO is greater than or equal to the reference value, the other-vehicle detector 18 outputs that the other-vehicle exists (S25, S26), and when the feature amount representing the existence of other-vehicle VO is less than the reference value, the other-vehicle detector 18 outputs that the other-vehicle does not exist (S25, S27).

According to the present embodiment, the detection reference value adjustment unit 16 of the other-vehicle detection device 10b, until the traveling state of the host vehicle VM being changed, detects the other-vehicle VO by setting the threshold value of the feature amount for detecting the other-vehicle VO to the threshold value such that the other-vehicle VO is detected more easily, and after the traveling state of the host vehicle VM being changed, detects the other-vehicle VO by setting the threshold value of the feature amount for detecting the other-vehicle VO to the threshold value such that the other-vehicle VO is detected with more difficulty. Therefore, in the situation where the erroneous detection can be easily accepted before the traveling state of the host vehicle VM is changed, it is possible to prevent the non-detection of the other-vehicle VO with the threshold value by which the other-vehicle VO is detected more easily. In the situation where the erroneous detection cannot be easily accepted after the traveling state of the host vehicle VM is changed, it is possible to prevent the erroneous detection of the other-vehicle VO with the threshold value by which the other-vehicle VO is detected with more difficulty.

The present invention is not limited to the embodiments described above, and various modifications can be made without departing from the spirit or scope of the present invention.

INDUSTRIAL APPLICABILITY

According to the other-vehicle detection device and the other-vehicle detection method, it is possible to detect the existence of the other-vehicle according to the situation more.

REFERENCE SIGNS LIST

10a, 10b other-vehicle detection device
12 surrounding information acquisition unit
14 relative position detection unit
16 detection reference value adjustment unit
18 other-vehicle detector
20 host vehicle state detector
120 sensors

The invention claimed is:

1. An other-vehicle detection device comprising:
   a sensor installed on a front part of a host vehicle,
   a sensor installed on a side surface of the host vehicle,
   a host vehicle state detector that detects whether or not the host vehicle causes an acceleration, a deceleration, and a steering to be changed, and
   an other-vehicle detection unit that detects an other-vehicle around the host vehicle based on a predetermined feature amount based on a detection value of the sensor installed on the front part of the host vehicle and the sensor installed on the side surface of the host vehicle,
   wherein, based on a position where the sensors are installed, the other-vehicle detection unit changes a threshold value of the feature amount for detecting the other-vehicle, and detects the other-vehicle,
   wherein, regarding the sensor disposed on the front part of the host vehicle, the other-vehicle detection unit detects the other-vehicle while setting the threshold value of the feature amount such that the other-vehicle is detected with more difficulty than the sensor installed on the side surface of the host vehicle, and
   wherein, when the host vehicle state detector detects any one of the change of the acceleration, the change of the deceleration, and the change of the steering, the other-vehicle detection unit detects the other-vehicle while setting the threshold value of the feature amount such that the other-vehicle is detected with more difficulty than when the host vehicle state detector does not detect any one of the change of the acceleration, the change of the deceleration, and the change of the steering.

2. An other-vehicle detection method for detecting an other-vehicle around a host vehicle using an other-vehicle detection device comprising a sensor installed on a front part of a host vehicle, a sensor installed on a side surface of the host vehicle, an other-vehicle detection unit that detects an other-vehicle around the host vehicle based on a predetermined feature amount based on a detection value of the sensor installed on the front part of the host vehicle and the sensor installed on the side surface of the host vehicle, and a host vehicle state detector that detects whether or not the host vehicle causes an acceleration, a deceleration, and a steering to be changed, comprising:

changing a threshold value of the feature amount for detecting the other-vehicle based on a position where the sensors are installed, and detecting the other-vehicle,     wherein, regarding the sensor disposed on the front part of the host vehicle, the other-vehicle detection unit detects the other-vehicle while setting the threshold value of the feature amount such that the other-vehicle is detected with more difficulty than the sensor installed on the side surface of the host vehicle, and     wherein, when the host vehicle state detector detects any one of the change of the acceleration, the change of the deceleration, and the change of the steering, the other-vehicle detection unit detects the other-vehicle while setting the threshold value of the feature amount such that the other-vehicle is detected with more difficulty than when the host vehicle state detector does not detect any one of the change of the acceleration, the change of the deceleration, and the change of the steering.

* * * * *